(12) United States Patent
Daly et al.

(10) Patent No.: US 8,805,319 B2
(45) Date of Patent: Aug. 12, 2014

(54) IDENTIFYING SOURCE OF TTY BASED EMERGENCY CALL

(71) Applicant: AT&T Intellectual Property I, L.P., Atlanta, GA (US)

(72) Inventors: Brian Kevin Daly, Seattle, WA (US); DeWayne A. Sennett, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 13/646,264

(22) Filed: Oct. 5, 2012

(65) Prior Publication Data

US 2014/0099909 A1    Apr. 10, 2014

(51) Int. Cl.
*G06F 15/16* (2006.01)

(52) U.S. Cl.
USPC .................................. 455/404.1; 455/412.1

(58) Field of Classification Search
USPC .................. 455/404.1, 412.1, 414.4, 445, 466
See application file for complete search history.

(56) References Cited

U.S. PATENT DOCUMENTS

2012/0317254 A1* 12/2012 Chekhanovskiy et al. ... 709/222

* cited by examiner

*Primary Examiner* — Sam Bhattacharya
(74) *Attorney, Agent, or Firm* — Baker & Hostetler LLP

(57) ABSTRACT

An message may be sent to an emergency call center. Before the message is received by the emergency call center, it may be determined that at least a portion of the message is not formatted in accordance with a teletypewriter protocol. The message may be reformatted in accordance with a TTY protocol. A second message may be provided to a public safety answering point. The second message may comprise the reformatted message and an indication of the original protocol of the reformatted message.

20 Claims, 8 Drawing Sheets

IDENTIFYING SOURCE OF TTY BASED EMERGENCY CALL

TECHNICAL FIELD

The technical field generally relates to public safety, and more specifically relates to providing a message to an emergency call center.

BACKGROUND

Typically, in an emergency situation, an individual calls 911 and describes the emergency situation. In some scenarios, such as when a person with a hearing and/or speech impairment needs to describe an emergency situation, a telephone call may not be adequate. Further, increasingly text messaging and data transfers are replacing voice-based calls. Existing approaches to accommodating various types of emergency callers and various forms of emergency calls may not be adequate.

SUMMARY

The following presents a simplified summary that describes some aspects and/or embodiments of the subject disclosure. This summary is not an extensive overview of the disclosure. Indeed, additional or alternative aspects and/or embodiments of the subject disclosure may be available beyond those described in the summary.

A relay center may be utilized to analyze, generate, and provide an emergency message (call) to an emergency call center. In an example embodiment, a message may be sent from a device to a protocol server in a relay center. The message may be in the form of an instant message (IM), a short message service (SMS), a multimedia messaging service (MMS), a real-time text (RTT), or the like, for example. Upon receipt of the message, the protocol server may determine that at least a portion of the message is not formatted according to a predetermined protocol, such as a teletypewriter (TTY) protocol for example. The protocol server may generate a reformatted message, for example, by reformatting each portion of the at least one portion of the received first message formatted in accordance with the first protocol to a respective portion formatted in accordance with the second protocol (e.g., a TTY protocol). A new message or second message may be provided to the emergency call center. The message may comprise an indication that it was not originally formatted in accordance with the second protocol. The message may further comprise information associated with the source (e.g., user and/or device) of the message.

Accordingly, a person may contact an emergency call center using any of a variety of types of messages. Further, as described herein, an emergency call taker may be informed of the source of the message and information associated with the source, and the emergency call taker may tailor a response accordingly.

DETAILED DESCRIPTION OF ILLUSTRATIVE EMBODIMENTS

Figure 1:
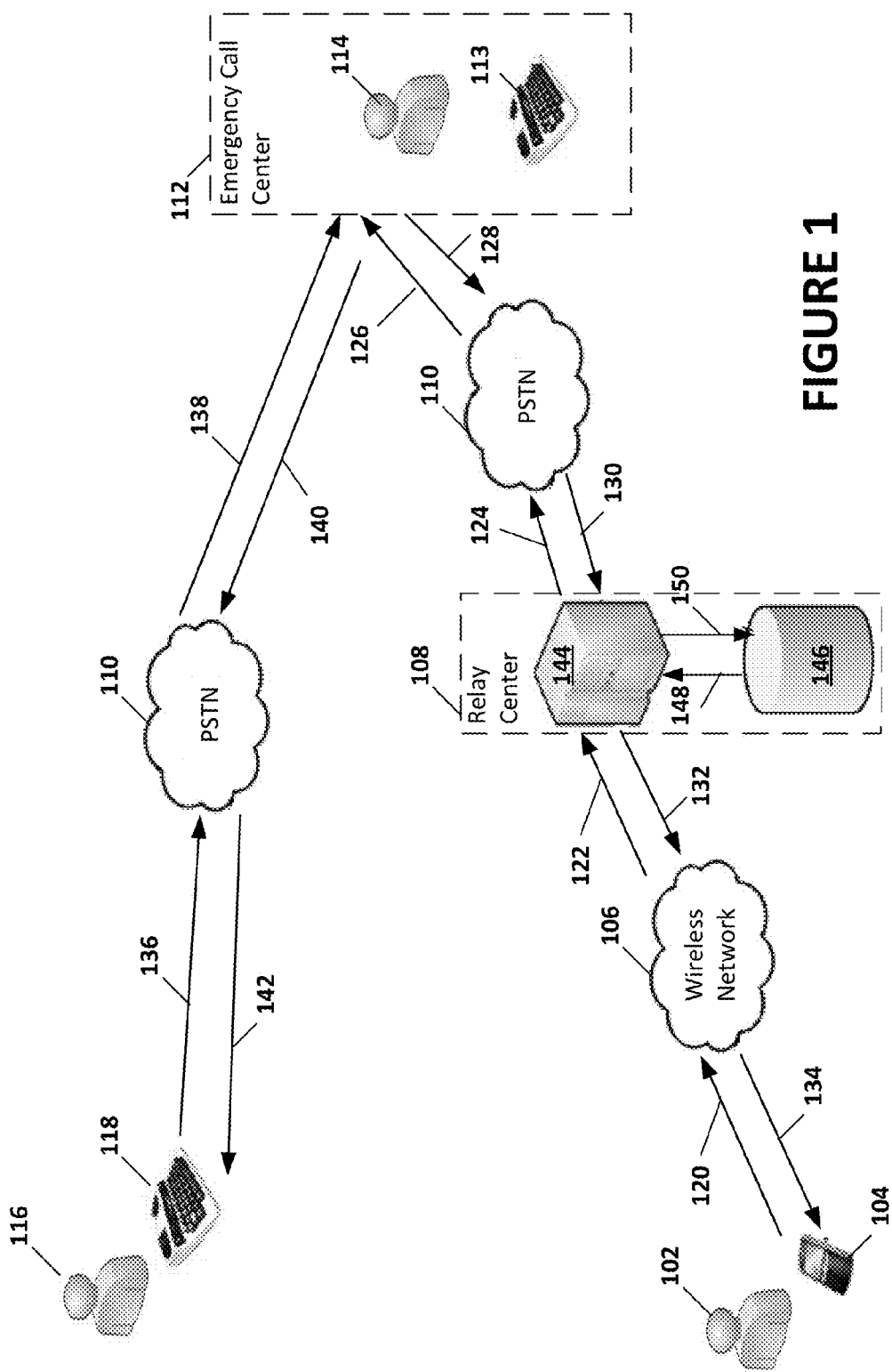
FIG. 1 illustrates an example system and process for providing emergency messages.

FIG. 1 illustrates an example system and process for providing emergency messages. As depicted in FIG. 1, a user (e.g., subscriber) 102, wants to make an emergency call to an emergency service, for example (e.g., to 911). The user 102 can start an application that has previously been installed on his/her communications device 104. The application can provide the user 102, via a user interface, or the like, on the communications device 104, the option to initiate a non-voice based (e.g., text based) session. In an example embodiment, an emergency call can be in any of various forms such as a text message, a message comprising video, an instant messaging (IM)-like message, a Short Message Service (SMS) message, a Multimedia Messaging Service (MMS) message, a web chat, real-time text (RTT), or the like. In an example configuration, a text based session could automatically be initiated via preferences in the user's profile. For example, the user 102 may compose a non-voice emergency message utilizing SMS, IM, email, or the like, or a combination thereof. In an example embodiment, the user 102, via the communications device 104, my assign the message a special short code or telephone number that may be designated for non-voice to 911 emergency messages. An emergency message may comprise any message intended for a public safety answering point (PSAP), for example.

For example, at steps 120 and 122, the communications device 104 may send a text-based message to a relay center 108 via the wireless network 106 (e.g., radio access network or the like). The relay center 108 may comprise a protocol server 144. The protocol server 144 may comprise any server, processor, computer, or the like, or any appropriate combination thereof. In various example embodiments, the protocol server 144 may be configured to receive and/or send messages, analyze messages, reformat message, transform messages or convert messages into a different protocol, generate messages with indications and/or information in messages, provide message to other entities, or any appropriate combination thereof.

Upon receipt of an emergency call or message that is formatted according to a first protocol, such as SMS for example, the protocol server 144 may analyze the received message and determine that an emergency condition exists. Examples of emergency conditions may include, but are not limited to, life threatening conditions being experienced by the user 102, life threatening health condition occurring to another individual near the location of the user 102, fire in the location of the user 102, fire in the neighboring buildings of the user's location, intruder in the user's home, break-in observed at neighbor's home, automobile accident experienced by the user 102, and automobile accident observed by the user 102.

The protocol server 144 may determine the communication protocol that corresponds to the received emergency message. For example, the protocol server 144 may determine that the emergency message is formatted according to the first protocol (e.g., SMS) and the protocol server may determine that the first protocol differs from a second protocol (e.g., TTY). Alternatively, the protocol server 144 may determine that at least a portion of the message is not formatted according to a second protocol such as, for example, a teletypewriter (TTY) protocol. A teletypewriter protocol may refer to a communication protocol that is able to be received by a telecommunications device for the deaf (TDD) or a TTY. The protocol server 144 may be configured, using a database lookup during the configuration of the protocol server 144, to check for a particular TTY protocol, such as a TTY protocol based on Baudot code for example. TTY protocols may comprise any of various protocols such as, for example, Baudot code, turbo code, European Deaf Telephone (EDF), dual-tone multi-frequency signaling (DTMF), or the like. In an example embodiment, the protocol server 144 may receive voice calls and perform voice-to-text and text-to-voice conversions, wherein the text component comprises a TTY protocol.

Upon determining that a portion of the received emergency message is not formatted according to a second protocol, the protocol server 144 may generate a reformatted message. For example, the protocol server 144 may convert a voice call to a TTY text message. The protocol server may reformat each portion of the at least one portion of the received first message that is formatted in accordance with the first protocol, to a respective portion formatted in accordance with the second protocol. For example, the protocol server 144 may determine that a portion of the received emergency message is not formatted according to a TTY protocol, and, in response to the determination, may convert the portion of the emergency message to the TTY protocol from the received first protocol (e.g., SMS).

Following the generation of a reformatted message, for example, the protocol server 144 may provide a new or second message that is formatted according to the second protocol (e.g., a TTY protocol). At steps 124 and 126, the new message (e.g., an emergency call) may be sent to the emergency call center 112 via the public switched telephone network (PSTN) 110 or the emergency services network. For example, the new message may comprise a call provided via an analog voice line or a voice over internet protocol (VoIP) connection. The new message that is provided by the protocol server 144 may be intended for a public safety answering point (PSAP), and may be received by a telecommunications device for the deaf (TDD) 113 at the intended PSAP. The new message may comprise the reformatted message that is formatted according to the second protocol and it may comprise an indication of the first (original) protocol of the emergency message. Such an indication may inform an emergency call taker 114 and/or a TDD 113 of the source of the call and/or that the new message originated as an emergency message that was formatted according to a protocol that was different from a TTY protocol, for example. For example, an indication in the preamble of a TTY message may inform an emergency call taker 114 that the emergency message was not sent via a TDD. Based on who and/or the type of device that originated the message (e.g., the source), the emergency call taker may tailor a response and/or a call, as described herein.

For example, the emergency call taker 114 may receive emergency calls at an emergency call center 112. The emergency call center 112 may comprise any appropriate emergency call center such as, for example, a public safety answering point (PSAP), a fire department, a police station, a public safety office, or the like. In an example embodiment, an emergency call taker 114 may use a TDD 113 to receive emergency calls from a TDD 118 and a communications device 104. For example, at steps 136 and 138, a hearing impaired user 116 may use the TDD device 118 to send an emergency message to the emergency call center 112 via the PSTN 110. Such an emergency message may be formatted according to a TTY protocol that is compatible with the TDD 118. The emergency call taker 114 may use a TDD 113 to receive messages formatted in a TTY protocol 113. A user 102 may use a communications device 104 to communicate with a TDD 113 via messages formatted according to a TTY protocol. For example, an emergency message may be converted into a TTY protocol via the protocol server 144.

Still referring to FIG. 1, upon determining that an emergency call has been received, the protocol server 144 may determine the identity of the originator (source) of the emergency call. For example, the identity may comprise a device identity, a user identity, a radio frequency (RF) identity, or any combination thereof. The originator may comprise a device (e.g., communication device 104 or TDD 118) and/or a user (e.g., user 102 or TDD user 116). For example, the protocol server 144 may determine that the identity of the originator is a specific mobile device, and the protocol server 144 may provide an indication of the identity of the originator in a new message intended for the emergency call center 112. For example, the identity of the originator may be determined from content in the body of the message, a header of the message, an identifier embedded in the message, a designated field of the message, video contained in the message, a graphic contained in the message, or the like, or any appropriate combination thereof.

Determining the source of a call or the identity of the originator may be accomplished via any appropriate means. For example, the protocol server 144 may interpret a caller ID mechanism to determine that the call originated from the mobile device 104 and/or the user 102. In an example embodiment, the identity of the originator is included in the preamble of a message that is routed to the relay center 108. In another example embodiment, an indication of the identity may be incorporated in the emergency message, and the identity may be used by the protocol server 144 to retrieve information associated with the source (originator) of the emergency message. At steps 140 and 142, the protocol server 144 may retrieve such information from a database 138. Alternatively, such information may be transmitted from the communication device 104 at steps 120 and 122. Such information may be referred to as auxiliary information, and auxiliary information may be retrieved from the database, received from a mobile device, or attained via a combination thereof. Any or all of the auxiliary information may be included as part of the new message that may be provided by the protocol server 136. For example, the protocol server 144 may provide an indication that indicates that a protocol conversion occurred, that the originator of the emergency message was not a TDD 118, that the originator was a mobile device 104 and/or a user 102, or any appropriate combination thereof. Auxiliary information may comprise information associated with the user 102, for example, known health conditions, medications, physical characteristics, mental characteristics, home address, work address, relatives, emergency point of contact, or the like. Such information may be provided to an emergency call taker 114 in the preamble of a message at steps 124 and 126. Auxiliary information may enable an emergency call talker to respond to an emergency message appropriately and efficiently.

In an example embodiment, auxiliary information is automatically transmitted from the communication device 104 when the communication device makes an emergency call. For example, the emergency call may trigger auxiliary information, that is stored in the communication device, to be sent to the protocol server 144, or the emergency call may comprise an indicator to enable the protocol server 144 to retrieve desired information from a database 146. The database 146 may be populated with the desired information that is associated with a user 102 and/or a device 104. For example, more than one user may operate a device 102, and therefore there may be indicators associated with each user, and/or with the device itself.

As a result of the foregoing described process, there may be increased access to emergency call centers, and an emergency call taker 112 may be able to respond to an emergency efficiently and appropriately. For example, when an emergency call taker is informed that a message received by the TDD 113 and formatted according to a TTY protocol did not originate as a TTY message, the call taker 114 may respond to the relay center 118 at steps 128 and 130. In an example embodiment, based on the identity of the originator of the emergency call and/or auxiliary information associated with the identity of the originator of the emergency call, the emergency call taker 114 may tailor a response to the specific needs of the user 102 and/or the communications device 104. For example, the protocol server 144 may convert a response from a TTY protocol to the original protocol (e.g., SMS), and the response may be sent to the communications device 104 via the wireless network 106, at steps 132 and 134. Similarly, if the emergency call taker is informed that an emergency message originated from a hearing impaired user 116 using a TDD 116, the emergency call taker may tailor the response at steps 140 and 142. For example, the call taker 114 may use the TDD 113 to respond with a message formatted according to the TTY protocol. The call taker 114 may utilize an audio line with the TDD 118 to record sounds corresponding to the emergency condition. A PSAP may implement a response tailored to disabled users when an emergency message is received from a TDD 118 and formatted according to a TTY protocol. In one example embodiment, an emergency call taker 114 may implement such a tailored response when it receives a message formatted according to a TTY protocol unless such a message comprises an indication and/or information that informs the emergency call taker 114 that the message did not originate in a TTY protocol. Such information may be formatted to appear on the screen of the TDD 113.

Figure 2:
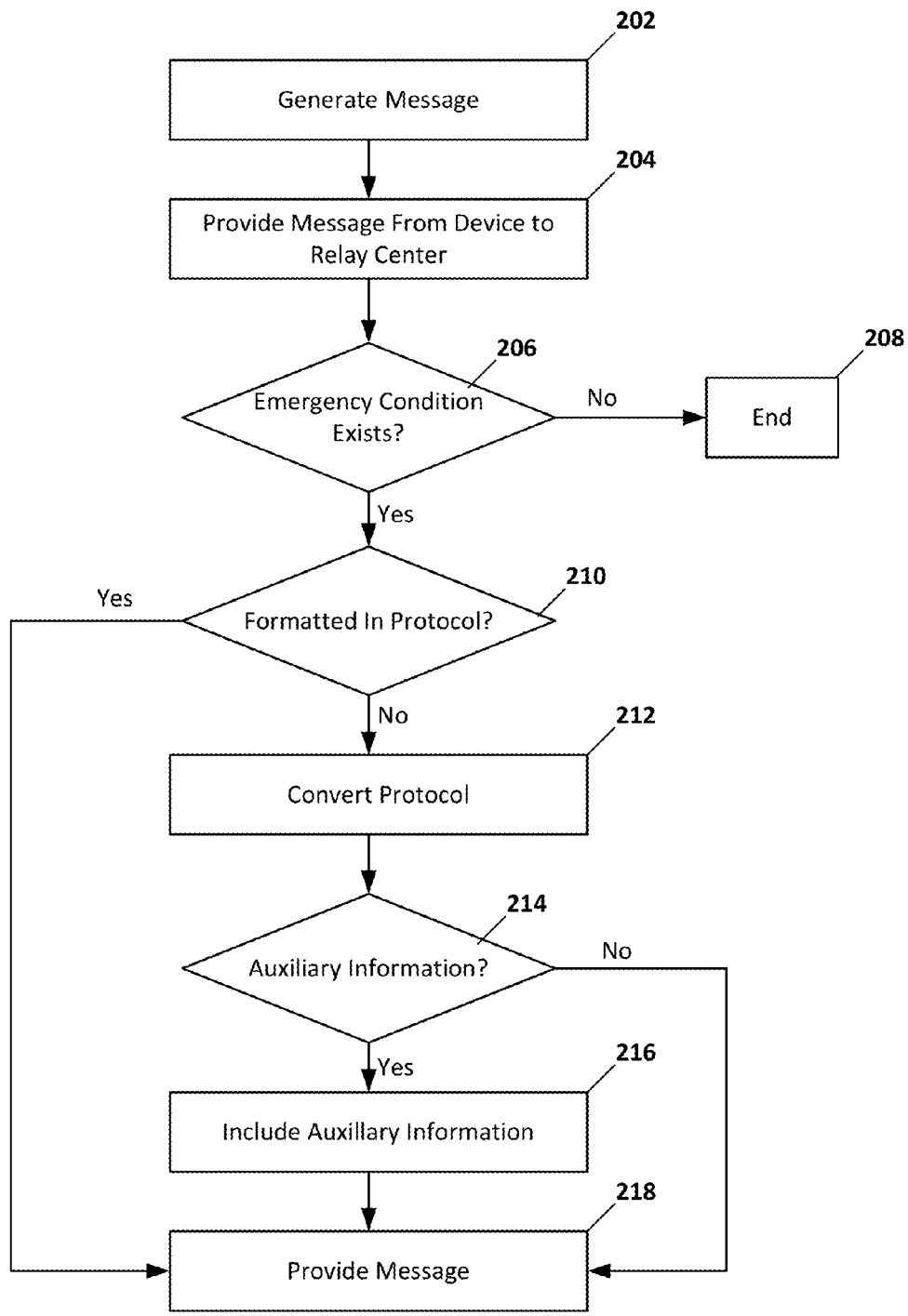
FIG. 2 is a flow diagram of an example process for providing a call to an emergency call center via a relay center.

FIG. 2 is a flow diagram of an example process for providing a call to an emergency call center via a relay center. A message is generated at step 202. The message may be generated by any appropriate device, such as, for example, a mobile communications device, or the like. In an example embodiment, the message may be in the form of a text message, a video message, an instant message (IM), a Short Message Service (SMS) message, a Multimedia Messaging Service (MMS) message, web chat, a real-time text (RTT), or the like. In an example configuration, a text based session may automatically be initiated via preferences in a user's profile. The user may compose a non-voice message utilizing SMS, IM, email, or the like, or a combination thereof. The user may assign the message a special short code or telephone number that may be designated for non-voice to 911 emergency messages.

The message may be provided to an intended recipient at step 204. In an example embodiment, the intended recipient may be a relay center. The relay center may analyze the message to determine if an emergency condition exists at step 206. The determination may be accomplished in any appropriate manner such as, for example, from analyzing content in the body of the message, analyzing a header of the message, analyzing an identifier embedded in the message, analyzing a designated field of the message, analyzing video contained in the message, analyzing a graphic contained in the message, or the like, or any appropriate combination thereof. If it is determined that an emergency condition does not exist (at step 206), the process ends at step 208.

If it is determined that an emergency condition does exist (at step 206), a call may be analyzed by the relay center, at step 210, to determine whether the received call is formatted according to a protocol, such as, for example, a TTY protocol. Such a determination may be accomplished by analyzing content in the body of the message, analyzing a header of the message, analyzing an identifier embedded in the message, analyzing the lack of an identifier in the message, or the like, or any appropriate combination thereof. If at least a portion of the received message (call) is not formatted according to the TTY protocol, for example, the message may be converted to a new protocol at step 212. For example, a protocol converter server in the relay center may reformat portions of the message to a TTY protocol. At step 214, the received message may be analyzed to determine whether there is auxiliary information associated with the source of the message. For example, auxiliary information may be included as part of the received call and/or auxiliary information may be retrieved from a database. Auxiliary information may be associated with the call's originator, such as a user of the communication device and/or the device itself. If no auxiliary information is associated with the source of the message, the message may be provided to an emergency call center at 218. If there is auxiliary information associated with the source of the original message, at 216, the auxiliary information may be included as part of a new message. At 218, the new message may be provided, for example, to an emergency call center. The message may comprise auxiliary information associated with a user and/or a device. The message may further comprise an indication of the first or original protocol of the message.

Figure 3:
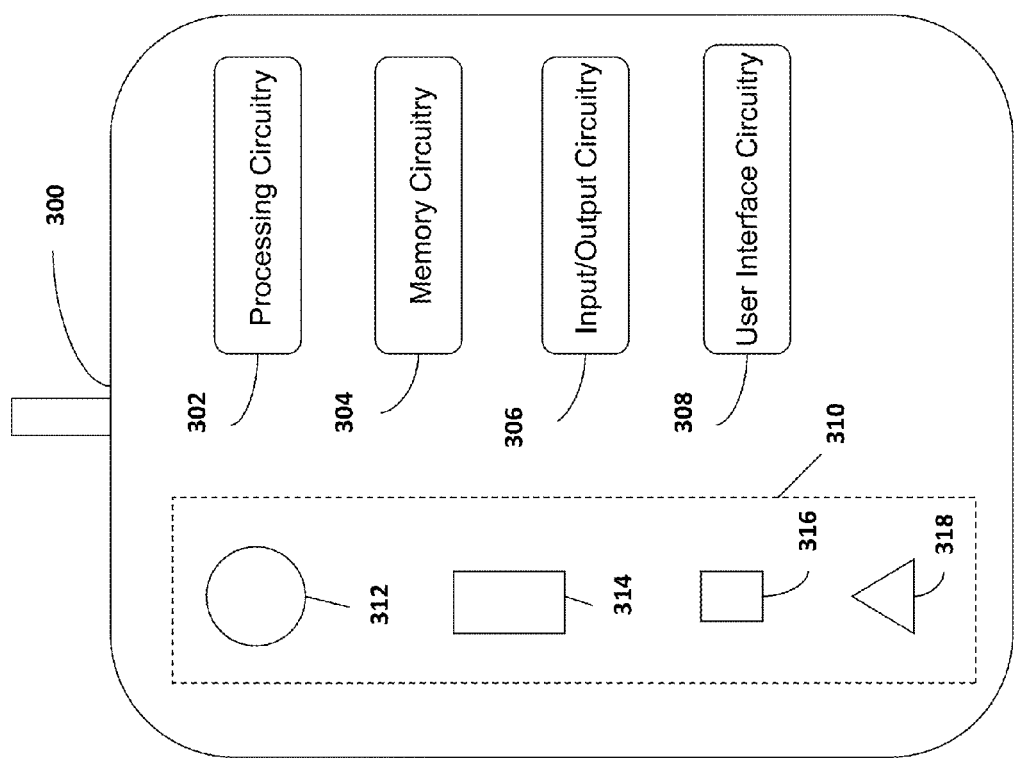
FIG. 3 is a block diagram of an example wireless communications device that is configurable to provide a message to a relay center.

FIG. 3 is a block diagram of an example wireless communications device 300 that is configurable to initiate a call to an emergency call center. In an example embodiment, the communication device 300 may comprise the communications device 104 described herein, for example, with respect to FIG. 1. The communications device 300 may include any appropriate device, mechanism, software, and/or hardware for initiating a call to an emergency call center as described herein. As described herein, the communications device 300 may comprise hardware or a combination of hardware and software. In an example configuration, the communications device 300 may comprise processing circuitry 302, memory circuitry 304, input/output circuitry 3066, user interface (UI) circuitry 308, and sensor circuitry 310 comprising at least one of a video camera portion 312, a force/wave sensor 314, a microphone 316, a moisture sensor 318, or a combination thereof. The force/wave sensor may comprise at least one of a motion detector, an accelerometer, an acoustic sensor, a tilt sensor, a pressure sensor, a temperature sensor, or the like. The motion detector may be configured to detect motion occurring outside of the communications device, for example via disturbance of a standing wave, via electromagnetic and/or acoustic energy, or the like. The accelerator may be capable of sensing acceleration, motion, and/or movement of the communications device. The acoustic sensor may be capable of sensing acoustic energy, such as a loud noise, for example. The tilt sensor may be capable of detecting a tilt of the communications device. The pressure sensor may be capable of sensing pressure against the communications device, such as from a shock wave caused by broken glass or the like. The temperature sensor may be capable of sensing a measuring temperature, such as inside of the vehicle, room, building, or the like. The moisture sensor 318 may be capable of detecting moisture, such as detecting if the communications device 300 is submerged in a liquid. The processing circuitry 302, memory circuitry 304, input/output circuitry 306, user interface (UI) circuitry 308, video camera portion 312, force/wave sensor 314, and microphone 316 may be coupled together to allow communications therebetween (coupling not shown in FIG. 3). The communications device may comprise a timer (not depicted in FIG. 3).

In various embodiments, the input/output circuitry 306 comprises a receiver of the communications device 300, a transmitter of the communications device 300, or a combination thereof. The input/output circuitry 306 is capable of receiving and/or providing information pertaining to initiating a call to an emergency call center as described herein. The input/output circuitry 306 also may be capable of communications with the wireless network 106, the relay center 108, the protocol server 144, the PSTN 110, and/or the emergency call center 112, as described herein. For example, the input/output circuitry 306 may include a wireless communications (e.g., 2.5G/3G/4G) SIM card. The input/output circuitry 306 may be capable of receiving and/or sending video information, audio information, control information, image information, data, or any combination thereof. In an example embodiment, the input/output circuitry 306 may be capable of receiving and/or sending information to determine a location of the communications device 300. In an example configuration, the input\output circuitry 306 may comprise a GPS receiver. In an example configuration, the communications device 300 may determine its own geographical location through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output circuitry 306 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or any appropriate combination thereof. In an example configuration, the input/output circuitry 306 may comprise a WIFI finder, a two way GPS chipset or equivalent, or the like.

The processing circuitry 302 may be capable of providing a message to an emergency call center as described herein. For example, the processing circuitry 302 may be capable of, in conjunction with any other portion of the communications device 300, executing an application for initiating a call to an emergency call center, generating a non-voice message, generating a voice message, communication with a relay center via a text message and/or voice message, communication with an emergency call center via a text message and/or voice message, processing a received text message, processing a received voice message, processing a retrieved text message, processing a retrieved voice message, generating a predetermined message, retrieving a predetermined message, processing non-voice messages provided via the user interface circuitry 308, processing voice messages provided via the user interface portion 308, processing text messages received via the input/output circuitry 306, processing voice messages received via the input/output circuitry 306, determining if an emergency condition exists, providing auxiliary information in an emergency message, placing a call on hold, establishing a multi-party call, or the like, or any combination thereof. The processing circuitry 302, in conjunction with any other portion of the communications device 300, may provide the ability for users/subscribers to enable, disable, and configure various features of an application for providing a message to an emergency call center, as described herein. For example, a user, subscriber, parent, healthcare provider, law enforcement agent, of the like, can define configuration parameters such as, for example, an emergency contact list, voice/text/image/video options for an emergency call, auxiliary information (e.g., health conditions of the user, medications that the user takes, etc.) to automatically be sent with an emergency call or message, threshold settings (e.g., timer settings, signature settings, etc.) to be utilized when sending and/or receiving a text/voice message to/from an emergency call taker/relay center. The processing circuitry 302, in conjunction with any other portion of the communications device 300, may enable the communications device 300 to covert speech to text when it is configured to send text messages. In an example embodiment, the processing circuitry 302, in conjunction with any other portion of the communications device 300, may be able to convert text to speech for rendering via the user interface circuitry 308.

In a basic configuration, the communications device 300 may include at least one memory circuitry 304. The memory circuitry 304 may be able to store any information utilized in conjunction with providing an emergency call as described herein. For example, the memory circuitry 304 may be capable of storing information pertaining to executing an application for initiating a call to an emergency call center, generating a non-voice message, generating a voice message, communication with a relay service center via a text message and/or voice message, communication with an emergency call center via a text message and/or voice message, processing a received text message, processing a received voice message, processing a retrieved text message, processing a retrieved voice message, generating a predetermined message, retrieving a predetermined message, processing non-voice messages provided via the user interface circuitry 308, processing voice messages provided via the user interface portion 308, processing text messages received via the input/output circuitry 306, processing voice messages received via the input/output circuitry 306, determining if an emergency condition exists, analyzing a call to determine if the call originated from a relay center, placing a call on hold, establishing a multi-party call, or the like, or any appropriate combination thereof. Depending upon the exact configuration and type of processor, the memory circuitry 304 may be volatile (such as some types of RAM), non-volatile (such as ROM, flash memory, etc.). The communications device 300 may include additional storage (e.g., removable storage and/or non-removable storage) including, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory, or the like. In an example configuration, the memory circuitry 304, or a portion of the memory circuitry 304 may hardened such that information stored therein can be recovered if the communications device 300 is exposed to extreme heat, extreme vibration, extreme moisture, corrosive chemicals or gas, or the like. In an example configuration, the information stored in the hardened portion of the memory circuitry 304 may be encrypted, or otherwise rendered unintelligible without use of an appropriate cryptographic key, password, biometric (voiceprint, fingerprint, retinal image, facial image, or the like). Wherein, use of the appropriate cryptographic key, password, biometric may render the information stored in the hardened portion of the memory circuitry 304 intelligible. In an example configuration, information stored in the memory circuitry may be triggered to be sent when an emergency message is sent, for example, to an emergency call taker. Such information may include, but is not limited to, characteristics of the user of the communications device 300 such as known health conditions, medications, physical characteristics, mental characteristics, home address, work address, relatives, emergency point of contact, or the like.

The communications device 300 also may contain UI circuitry 308 allowing a user to communicate with the communications device 300. The UI circuitry 308 may be capable of rendering any information utilized in conjunction with providing a message to an emergency call center as described herein. For example, the UI circuitry 308 may contain circuitry for entering text, entering a phone number, rendering text, rendering images, rendering multimedia, rendering sound, rendering video, receiving sound, rendering auxiliary information associated with the use, or the like, as described herein. The UI circuitry 308 may provide the ability to control the communications device 300, via, for example, buttons, soft keys, voice actuated controls, a touch screen, movement of the mobile communications device 300, visual cues (e.g., moving a hand in front of a camera on the mobile communications device 300), or the like. The UI circuitry 308 may provide visual information (e.g., via a display), audio information (e.g., via speaker), mechanically (e.g., via a vibrating mechanism), or a combination thereof. In various configurations, the UI circuitry 308 may comprise a display, a touch screen, a keyboard, a speaker, or any combination thereof. The UI circuitry 308 may comprise circuitry for inputting biometric information, such as, for example, fingerprint information, retinal information, voice information, and/or facial characteristic information. The UI circuitry 308 may be utilized to enter an indication of the designated destination (e.g., the phone number, IP address, or the like).

In an example embodiment, the sensor circuitry 310 of the communications device 300 may comprise the video camera portion 312, the force/wave sensor 314, and the microphone 316. The video camera portion 312 may comprise a camera (or cameras) and associated equipment capable of capturing still images and/or video and to provide the captured still images and/or video to other portions of the communications device 300. In an example embodiment, the force/wave sensor 314 may comprise an accelerometer, a tilt sensor, an acoustic sensor capable of sensing acoustic energy, an optical sensor (e.g., infrared), or any combination thereof.

Figure 4:
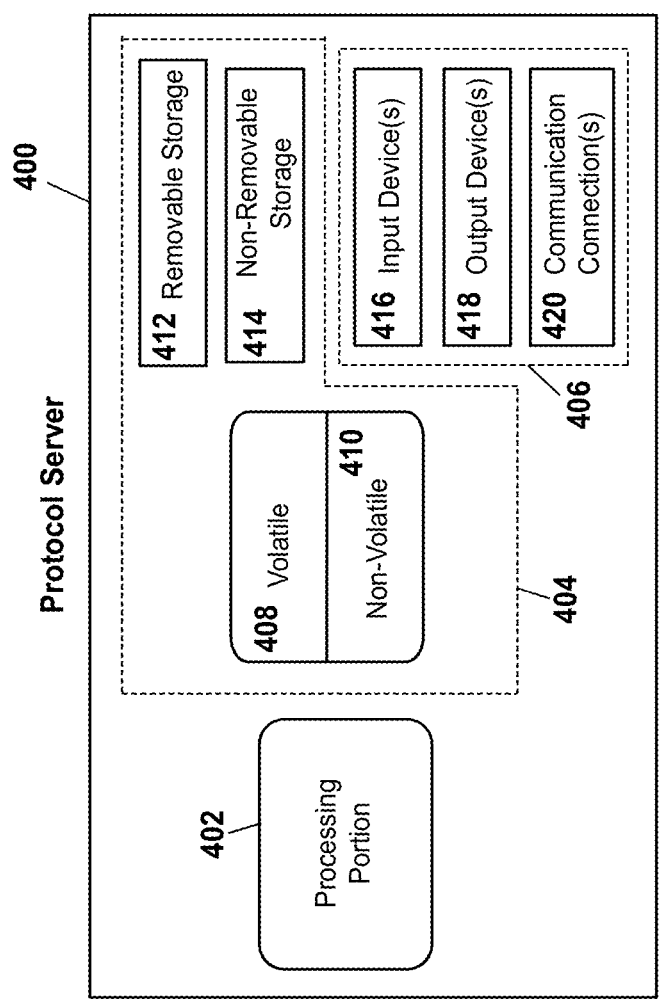
FIG. 4 is a block diagram of an example protocol server.

FIG. 4 is a block diagram of an example protocol server 400. In an example embodiment, the protocol server may comprise the protocol server 144 described herein. In an example embodiment, the protocol server 400 comprises hardware or a combination of hardware and software. The functionality needed to facilitate providing a message to an emergency call center may reside in any one or combination of protocol servers. The protocol server 400 depicted in FIG. 4 represents any appropriate entity, apparatus, or combination of entities or apparatuses, such as a processor, a server, a gateway, etc., or any combination thereof. It is emphasized that the block diagram depicted in FIG. 4 is exemplary and not intended to imply a specific implementation or configuration. Thus, the protocol server 400 may be implemented in a single processor or multiple processors (e.g., single server or multiple servers, single gateway or multiple gateways, etc.). Multiple servers may be distributed or centrally located. Multiple servers may communicate wirelessly, via hard wire, or a combination thereof.

In an example configuration, the protocol server 400 may comprise processing circuitry 402, memory circuitry 404, and input/output circuitry 406. The processing circuitry 402, memory circuitry 404, and input/output circuitry 406 are coupled together (coupling not shown in FIG. 4) to allow communications therebetween. The processing circuitry 402 may be capable of performing functions associated with analyzing, converting, and providing messages to an emergency call center, as described herein. For example, the processing circuitry 402 may be capable of, in conjunction with any other portion of the protocol server 400, executing an application for providing messages to an emergency call center, generating a non-voice message, generating a voice message, converting communication protocols, communication via a text message and/or voice message, processing a received text message, processing a received voice message, processing a retrieved text message, processing a retrieved voice message, generating a predetermined message, retrieving a predetermined message, processing text messages received via the input/output circuitry 406, processing voice messages received via the input/output circuitry 406, determining if an emergency condition exists, determining if a message is formatted according to a communication protocol, or the like, or any combination thereof. The processing circuitry 402, in conjunction with any other portion of the protocol server 400, may provide the ability for users to enable, disable, and configure various features of an application for analyzing, generating, and providing messages to an emergency call center, as described herein. The processing circuitry 402, in conjunction with any other portion of the communications device 300, may enable the protocol server 400 to covert speech to text when it is configured to send text messages. In an example embodiment, the processing circuitry 402, in conjunction with any other portion of the protocol server 400, may be able to convert text to speech.

The input/output circuitry 406 may be capable of receiving and/or providing information from/to a device (e.g., communications device 104, communications device 300, TDD 113), other relay service servers, other relay centers, and/or emergency call centers, when providing a message to an emergency call center, as described herein. The input/output circuitry 406 may be capable of communications with the wireless network 106, another relay center, another protocol server, the communications device 104, the communications device 300, the TDD 113, and/or the emergency call center 112, as described herein. For example, the input/output circuitry 406 may include a wireless communications (e.g., 2.5G/3G/4G) SIM card. The input/output circuitry 406 may be capable of receiving and/or sending video information, audio information, control information, image information, data, or any combination thereof. In an example embodiment, the input/output circuitry 406 may be capable of receiving and/or sending information to determine a location of a communications device (e.g., communications device 104, communications device 300). In an example configuration, the input\output circuitry 406 may comprise a GPS receiver. In an example configuration, a geographical location may be determined through any type of location determination system including, for example, the Global Positioning System (GPS), assisted GPS (A-GPS), time difference of arrival calculations, configured constant location (in the case of non-moving devices), any combination thereof, or any other appropriate means. In various configurations, the input/output circuitry 406 may receive and/or provide information via any appropriate means, such as, for example, optical means (e.g., infrared), electromagnetic means (e.g., RF, WI-FI, BLUETOOTH, ZIGBEE, etc.), acoustic means (e.g., speaker, microphone, ultrasonic receiver, ultrasonic transmitter), or any appropriate combination thereof. In an example configuration, the input/output circuitry may comprise a WIFI finder, a two way GPS chipset or equivalent, or the like.

The memory circuitry 404 may store any information utilized in conjunction with analyzing and providing a message to an emergency call center, as described herein. For example, the memory circuitry 404 may be capable of storing information pertaining to executing an application for providing a message to an emergency call center, generating a non-voice message, generating a voice message, communication with a relay center via a text message and/or voice message, communication with an emergency call center via a text message and/or voice message, processing a received text message, processing a received voice message, processing a retrieved text message, processing a retrieved voice message, generating a predetermined message, retrieving a predetermined message, processing text messages received via the input/output circuitry 406, processing voice messages received via the input/output circuitry 406, determining if an emergency condition exists, determining a protocol that corresponds to a received message, analyzing a call, maintaining multi-mode communications, or the like, as described herein, or any appropriate combination thereof. In an example embodiment, the memory circuitry 404 may be capable of storing information associated with various communication devices and/or users (e.g., subscribers) of communication devices. Such information may include, for example, known health conditions, medications, physical characteristics, mental characteristics, home address, work address, relatives, emergency point of contact, or the like.

Depending upon the exact configuration and type of protocol server 400, the memory circuitry 404 may include computer storage media that is volatile 408 (such as dynamic RAM), non-volatile 410 (such as ROM), or a combination thereof. The protocol server 400 may include additional storage, in the form of computer storage media (e.g., removable storage 412 and/or non-removable storage 414) including, RAM, ROM, EEPROM, tape, flash memory, smart cards, CD-ROM, digital versatile disks (DVD) or other optical storage, magnetic cassettes, magnetic tape, magnetic disk storage or other magnetic storage devices, universal serial bus (USB) compatible memory. As described herein, a computer storage medium is an article of manufacture and thus not a transient signal.

The protocol server 400 also may contain communications connection(s) 420 that allow the protocol server 400 to communicate with other devices, entities, databases, servers, or the like. A communications connection(s) can comprise communication media. Communication media may be used to communicate computer readable instructions, data structures, program modules, or other data. Communication media can include an appropriate transport mechanism or information delivery media that may be used to transport a modulated data signal such as a carrier wave.

The protocol server 400 also may include input device(s) 416 such as keyboard, mouse, pen, voice input device, touch input device, etc. Output device(s) 418 such as a display, speakers, printer, etc. also can be included.

Communications devices (e.g., communications device 104, communications device 300, TDD 113) and servers (e.g., protocol server 144, protocol server 400) may be part of and/or in communication with various wireless communications networks. Some of which are described below.

Figure 5:
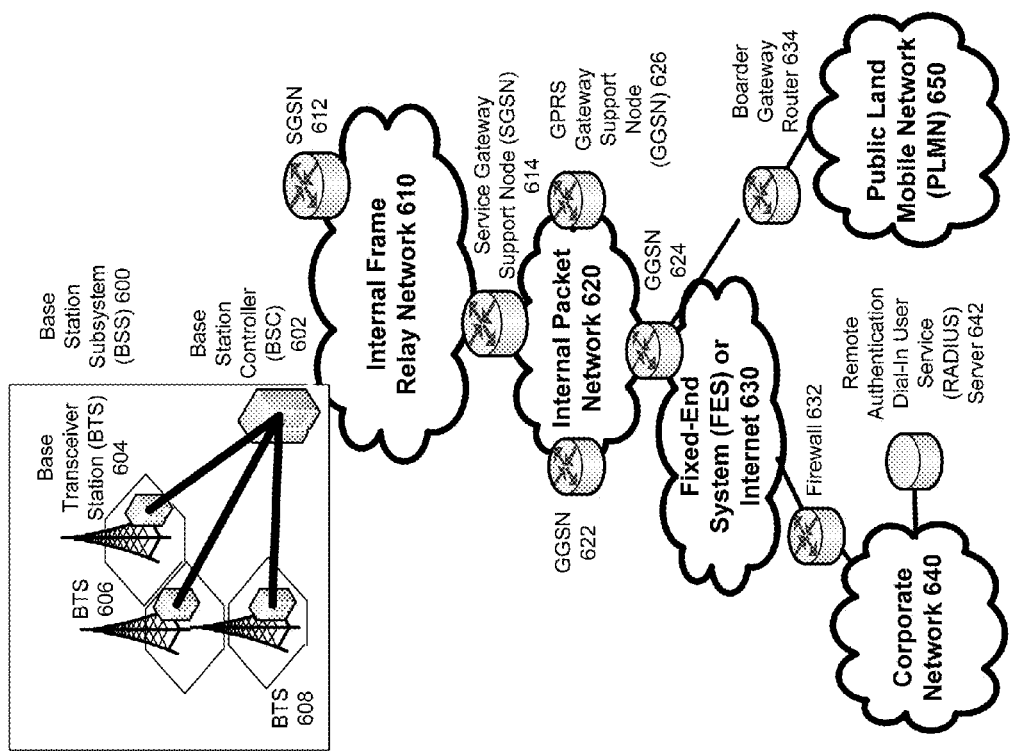
FIG. 5 depicts an overall block diagram of an exemplary packet-based mobile cellular network environment, such as a GPRS network, in which providing a message (call) to an emergency call center may be implemented.

FIG. 5 depicts an overall block diagram of an exemplary packet-based mobile cellular network environment, such as a GPRS network, in which generation of a message to an emergency call center may be implemented. In the exemplary packet-based mobile cellular network environment shown in FIG. 5, there are a plurality of Base Station Subsystems ("BSS") 600 (only one is shown), each of which comprises a Base Station Controller ("BSC") 602 serving a plurality of Base Transceiver Stations ("BTS") such as BTSs 604, 606, and 608. BTSs 604, 606, 608, etc. are the access points where users of packet-based mobile devices become connected to the wireless network. In exemplary fashion, the packet traffic originating from user devices is transported via an over-the-air interface to a BTS 608, and from the BTS 608 to the BSC 602. Base station subsystems, such as BSS 600, are a part of internal frame relay network 610 that can include Service GPRS Support Nodes ("SGSN") such as SGSN 612 and 614. Each SGSN is connected to an internal packet network 620 through which a SGSN 612, 614, etc. can route data packets to and from a plurality of gateway GPRS support nodes (GGSN) 622, 624, 626, etc. As illustrated, SGSN 614 and GGSNs 622, 624, and 626 are part of internal packet network 620. Gateway GPRS serving nodes 622, 624 and 626 mainly provide an interface to external Internet Protocol ("IP") networks such as Public Land Mobile Network ("PLMN") 650, corporate intranets 640, or Fixed-End System ("FES") or the public Internet 630. As illustrated, subscriber corporate network 640 may be connected to GGSN 624 via firewall 632; and PLMN 650 is connected to GGSN 624 via boarder gateway router 634. The Remote Authentication Dial-In User Service ("RADIUS") server 642 may be used for caller authentication when a user of a mobile cellular device calls corporate network 640.

Generally, there may be a several cell sizes in a GSM network, referred to as macro, micro, pico, femto and umbrella cells. The coverage area of each cell is different in different environments. Macro cells can be regarded as cells in which the base station antenna is installed in a mast or a building above average roof top level. Micro cells are cells whose antenna height is under average roof top level. Microcells are typically used in urban areas. Pico cells are small cells having a diameter of a few dozen meters. Pico cells are used mainly indoors. Femto cells have the same size as pico cells, but a smaller transport capacity. Femto cells are used indoors, in residential, or small business environments. On the other hand, umbrella cells are used to cover shadowed regions of smaller cells and fill in gaps in coverage between those cells.

Figure 6:
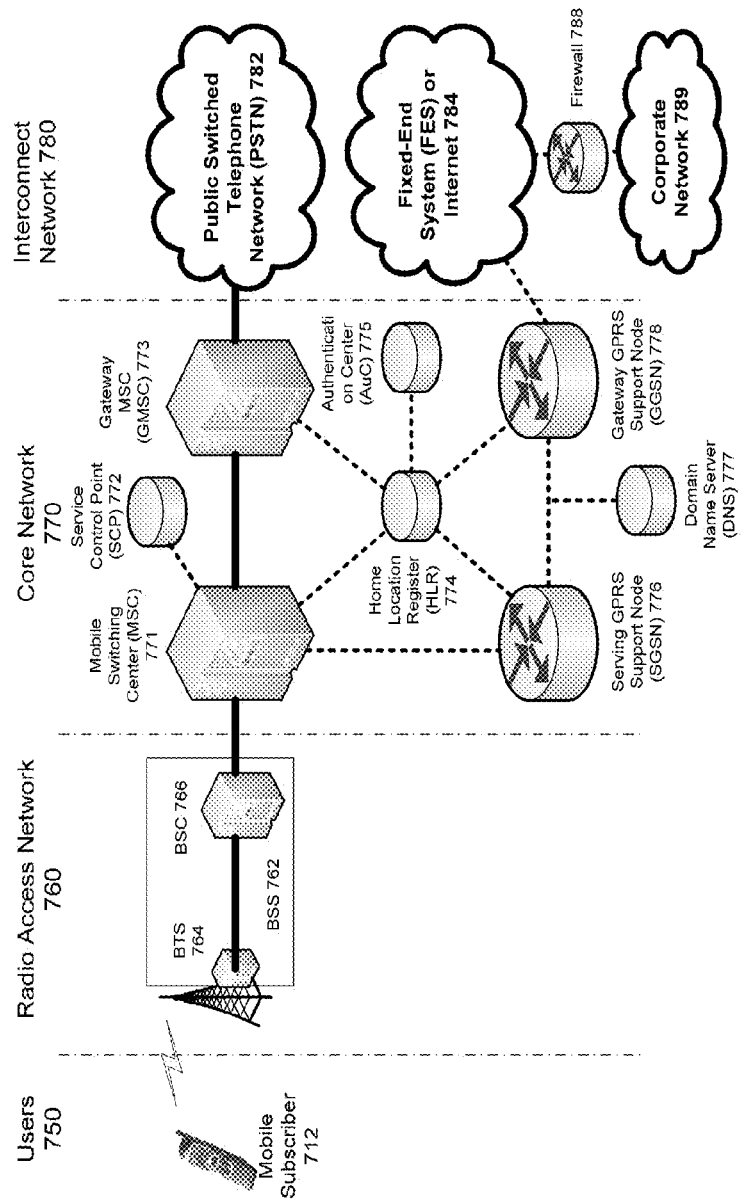
FIG. 6 illustrates an architecture of a typical GPRS network in which providing a message (call) to an emergency call center may be implemented.

FIG. 6 illustrates an architecture of a typical GPRS network in which initiation of a call to an emergency call center may be implemented. The architecture depicted in FIG. 6 is segmented into four groups: users 750, radio access network 760, core network 770, and interconnect network 780. Users 750 comprise a plurality of end users. Note, device 712 is referred to as a mobile subscriber in the description of network shown in FIG. 6. In an example embodiment, the device depicted as mobile subscriber 712 comprises a communications device (e.g., communications device 104, communications device 300). Radio access network 760 comprises a plurality of base station subsystems such as BSSs 762, which include BTSs 764 and BSCs 766. Core network 770 comprises a host of various network elements. As illustrated in FIG. 6, core network 770 may comprise Mobile Switching Center ("MSC") 771, Service Control Point ("SCP") 772, gateway MSC 773, SGSN 776, Home Location Register ("HLR") 774, Authentication Center ("AuC") 775, Domain Name Server ("DNS") 777, and GGSN 778. Interconnect network 780 also comprises a host of various networks and other network elements. As illustrated in FIG. 6, interconnect network 780 comprises Public Switched Telephone Network ("PSTN") 782, Fixed-End System ("FES") or Internet 784, firewall 788, and Corporate Network 789.

A mobile switching center may be connected to a large number of base station controllers. At MSC 771, for instance, depending on the type of traffic, the traffic may be separated in that voice may be sent to Public Switched Telephone Network ("PSTN") 782 through Gateway MSC ("GMSC") 773, and/or data may be sent to SGSN 776, which then sends the data traffic to GGSN 778 for further forwarding.

When MSC 771 receives call traffic, for example, from BSC 766, it sends a query to a database hosted by SCP 772. The SCP 772 processes the request and issues a response to MSC 771 so that it may continue call processing as appropriate.

The HLR 774 is a centralized database for users to register to the GPRS network. HLR 774 stores static information about the subscribers such as the International Mobile Subscriber Identity ("IMSI"), subscribed services, and a key for authenticating the subscriber. HLR 774 also stores dynamic subscriber information such as the current location of the mobile subscriber. Associated with HLR 774 is AuC 775. AuC 775 is a database that contains the algorithms for authenticating subscribers and includes the associated keys for encryption to safeguard the user input for authentication.

In the following, depending on context, the term "mobile subscriber" sometimes refers to the end user and sometimes to the actual portable device, such as a mobile device, used by an end user of the mobile cellular service. When a mobile subscriber turns on his or her mobile device, the mobile device goes through an attach process by which the mobile device attaches to an SGSN of the GPRS network. In FIG. 6, when mobile subscriber 712 initiates the attach process by turning on the network capabilities of the mobile device, an attach request is sent by mobile subscriber 712 to SGSN 776. The SGSN 776 queries another SGSN, to which mobile subscriber 712 was attached before, for the identity of mobile subscriber 712. Upon receiving the identity of mobile subscriber 712 from the other SGSN, SGSN 776 requests more information from mobile subscriber 712. This information is used to authenticate mobile subscriber 712 to SGSN 776 by HLR 774. Once verified, SGSN 776 sends a location update to HLR 774 indicating the change of location to a new SGSN, in this case SGSN 776. HLR 774 notifies the old SGSN, to which mobile subscriber 712 was attached before, to cancel the location process for mobile subscriber 712. HLR 774 then notifies SGSN 776 that the location update has been performed. At this time, SGSN 776 sends an Attach Accept message to mobile subscriber 712, which in turn sends an Attach Complete message to SGSN 776.

After attaching itself with the network, mobile subscriber 712 then goes through the authentication process. In the authentication process, SGSN 776 sends the authentication information to HLR 774, which sends information back to SGSN 776 based on the user profile that was part of the user's initial setup. The SGSN 776 then sends a request for authentication and ciphering to mobile subscriber 712. The mobile subscriber 712 uses an algorithm to send the user identification (ID) and password to SGSN 776. The SGSN 776 uses the same algorithm and compares the result. If a match occurs, SGSN 776 authenticates mobile subscriber 712.

Next, the mobile subscriber 712 establishes a user session with the destination network, corporate network 789, by going through a Packet Data Protocol ("PDP") activation process. Briefly, in the process, mobile subscriber 712 requests access to the Access Point Name ("APN"), for example, UPS.com, and SGSN 776 receives the activation request from mobile subscriber 712. SGSN 776 then initiates a Domain Name Service ("DNS") query to learn which GGSN node has access to the UPS.com APN. The DNS query is sent to the DNS server within the core network 770, such as DNS 777, which is provisioned to map to one or more GGSN nodes in the core network 770. Based on the APN, the mapped GGSN 778 can access the requested corporate network 789. The SGSN 776 then sends to GGSN 778 a Create Packet Data Protocol ("PDP") Context Request message that contains necessary information. The GGSN 778 sends a Create PDP Context Response message to SGSN 776, which then sends an Activate PDP Context Accept message to mobile subscriber 712.

Once activated, data packets of the call made by mobile subscriber 712 can then go through radio access network 760, core network 770, and interconnect network 780, in a particular fixed-end system or Internet 784 and firewall 788, to reach corporate network 789.

Figure 7:
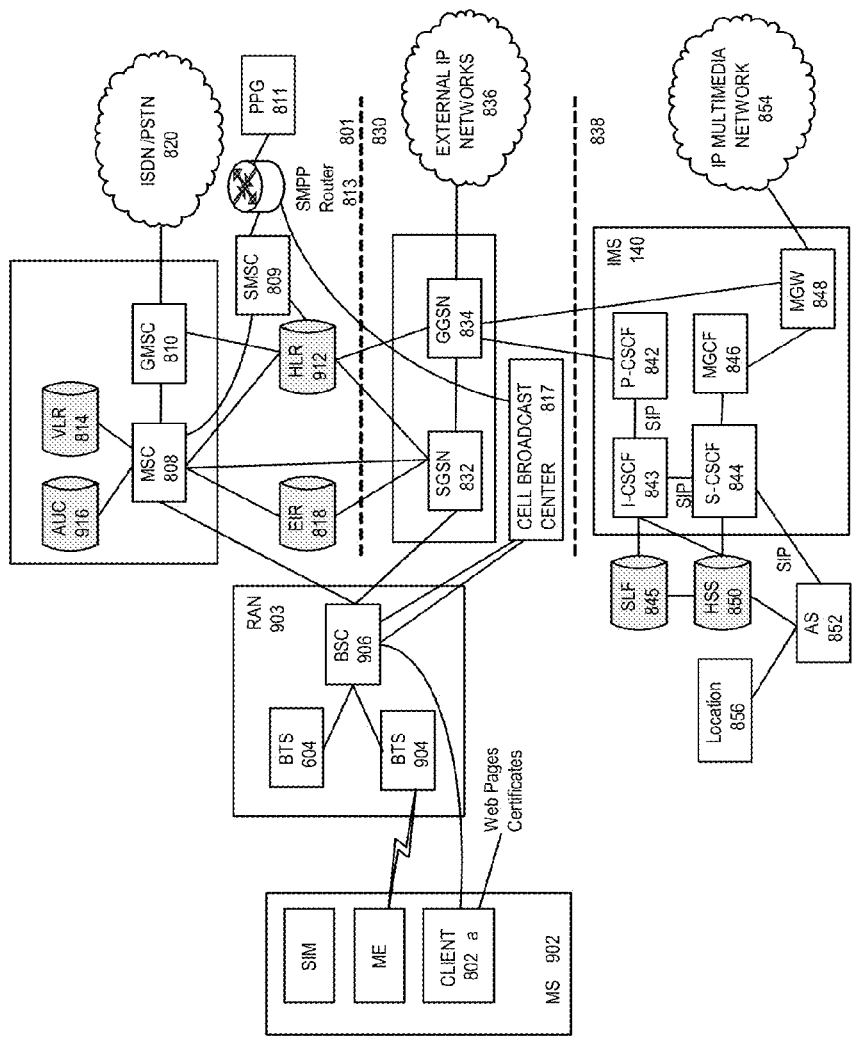
FIG. 7 illustrates an exemplary block diagram view of a GSM/GPRS/IP multimedia network architecture within providing a message (call) to an emergency call center may be implemented.

FIG. 7 illustrates an exemplary block diagram view of a GSM/GPRS/IP multimedia network architecture within which providing a message to an emergency call center may be implemented. As illustrated, the architecture of FIG. 7 includes a GSM core network 801, a GPRS network 830 and an IP multimedia network 838. The GSM core network 801 includes a Mobile Station (MS) 802, at least one Base Transceiver Station (BTS) 804 and a Base Station Controller (BSC) 806. The MS 802 is physical equipment or Mobile Equipment (ME), such as a mobile phone or a laptop computer that is used by mobile subscribers, with a Subscriber identity Module (SIM) or a Universal Integrated Circuit Card (UICC). The SIM or UICC includes an International Mobile Subscriber Identity (IMSI), which is a unique identifier of a subscriber. The BTS 804 is physical equipment, such as a radio tower, that enables a radio interface to communicate with the MS. Each BTS may serve more than one MS. The BSC 806 manages radio resources, including the BTS. The BSC may be connected to several BTSs. The BSC and BTS components, in combination, are generally referred to as a base station (BSS) or radio access network (RAN) 803.

The GSM core network 801 also includes a Mobile Switching Center (MSC) 808, a Gateway Mobile Switching Center (GMSC) 810, a Home Location Register (HLR) 812, Visitor Location Register (VLR) 814, an Authentication Center (AuC) 818, and an Equipment Identity Register (EIR) 816. The MSC 808 performs a switching function for the network. The MSC also performs other functions, such as registration, authentication, location updating, handovers, and call routing. The GMSC 810 provides a gateway between the GSM network and other networks, such as an Integrated Services Digital Network (ISDN) or Public Switched Telephone Networks (PSTNs) 820. Thus, the GMSC 810 provides interworking functionality with external networks.

The HLR 812 is a database that contains administrative information regarding each subscriber registered in a corresponding GSM network. The HLR 812 also contains the current location of each MS. The VLR 814 is a database that contains selected administrative information from the HLR 812. The VLR contains information necessary for call control and provision of subscribed services for each MS currently located in a geographical area controlled by the VLR. The HLR 812 and the VLR 814, together with the MSC 808, provide the call routing and roaming capabilities of GSM. The AuC 816 provides the parameters needed for authentication and encryption functions. Such parameters allow verification of a subscriber's identity. The EIR 818 stores security-sensitive information about the mobile equipment.

A Short Message Service Center (SMSC) 809 allows one-to-one Short Message Service (SMS) messages to be sent to/from the MS 802. A Push Proxy Gateway (PPG) 811 is used to "push" (e.g., send without a synchronous request) content to the MS 802. The PPG 811 acts as a proxy between wired and wireless networks to facilitate pushing of data to the MS 802. A Short Message Peer to Peer (SMPP) protocol router 813 is provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 802 sends a location update including its current location information to the MSC/VLR, via the BTS 804 and the BSC 806. The location information is then sent to the MS's HLR. The HLR is updated with the location information received from the MSC/VLR. The location update also is performed when the MS moves to a new location area. Typically, the location update is periodically performed to update the database as location updating events occur.

The GPRS network 830 is logically implemented on the GSM core network architecture by introducing two packet-switching network nodes, a serving GPRS support node (SGSN) 832, a cell broadcast and a Gateway GPRS support node (GGSN) 834. The SGSN 832 is at the same hierarchical level as the MSC 808 in the GSM network. The SGSN controls the connection between the GPRS network and the MS 802. The SGSN also keeps track of individual MS's locations and security functions and access controls.

A Cell Broadcast Center (CBC) 817 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 834 provides a gateway between the GPRS network and a public packet network (PDN) or other IP networks 836. That is, the GGSN provides interworking functionality with external networks, and sets up a logical link to the MS through the SGSN. When packet-switched data leaves the GPRS network, it is transferred to an external TCP-IP network 836, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one of three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time.

A class B MS can attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

A GPRS network 830 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how to signal towards the network. The network operation mode represents the capabilities of the GPRS network. In a NOM1 network, a MS can receive pages from a circuit switched domain (voice call) when engaged in a data call. The MS can suspend the data call or take both simultaneously, depending on the ability of the MS. In a NOM2 network, a MS may not receive pages from a circuit switched domain when engaged in a data call, since the MS is receiving data and is not listening to a paging channel. In a NOM3 network, a MS can monitor pages for a circuit switched network while received data and vice versa.

The IP multimedia network 838 was introduced with 3GPP Release 8, and includes an IP multimedia subsystem (IMS) 840 to provide rich multimedia services to end users. A representative set of the network entities within the IMS 840 are a call/session control function (CSCF), a media gateway control function (MGCF) 846, a media gateway (MGW) 848, and a master subscriber database, called a home subscriber server (HSS) 850. The HSS 850 may be common to the GSM network 801, the GPRS network 830 as well as the IP multimedia network 838.

The IP multimedia system 840 is built around the call/session control function, of which there are three types: an interrogating CSCF (I-CSCF) 843, a proxy CSCF (P-CSCF) 842, and a serving CSCF (S-CSCF) 844. The P-CSCF 842 is the MS's first point of contact with the IMS 840. The P-CSCF 842 forwards session initiation protocol (SIP) messages received from the MS to an SIP server in a home network (and vice versa) of the MS. The P-CSCF 842 may also modify an outgoing request according to a set of rules defined by the network operator (for example, address analysis and potential modification).

The I-CSCF 843, forms an entrance to a home network and hides the inner topology of the home network from other networks and provides flexibility for selecting an S-CSCF. The I-CSCF 843 may contact a subscriber location function (SLF) 845 to determine which HSS 850 to use for the particular subscriber, if multiple HSS's 850 are present. The S-CSCF 844 performs the session control services for the MS 802. This includes routing originating sessions to external networks and routing terminating sessions to visited networks. The S-CSCF 844 also decides whether an application server (AS) 852 is required to receive information on an incoming SIP session request to ensure appropriate service handling. This decision is based on information received from the HSS 850 (or other sources, such as an application server 852). The AS 852 also communicates to a location server 856 (e.g., a Gateway Mobile Location Center (GMLC)) that provides a position (e.g., latitude/longitude coordinates) of the MS 802.

The HSS 850 contains a subscriber profile and keeps track of which core network node is currently handling the subscriber. It also supports subscriber authentication and authorization functions (AAA). In networks with more than one HSS 850, a subscriber location function provides information on the HSS 850 that contains the profile of a given subscriber.

The MGCF 846 provides interworking functionality between SIP session control signaling from the IMS 840 and ISUP/BICC call control signaling from the external GSTN networks (not shown). It also controls the media gateway (MGW) 848 that provides user-plane interworking functionality (e.g., converting between AMR- and PCM-coded voice). The MGW 848 also communicates with other IP multimedia networks 854.

Push to Talk over Cellular (PoC) capable mobile phones register with the wireless network when the phones are in a predefined area (e.g., job site, etc.). When the mobile phones leave the area, they register with the network in their new location as being outside the predefined area. This registration, however, does not indicate the actual physical location of the mobile phones outside the pre-defined area.

Figure 8:
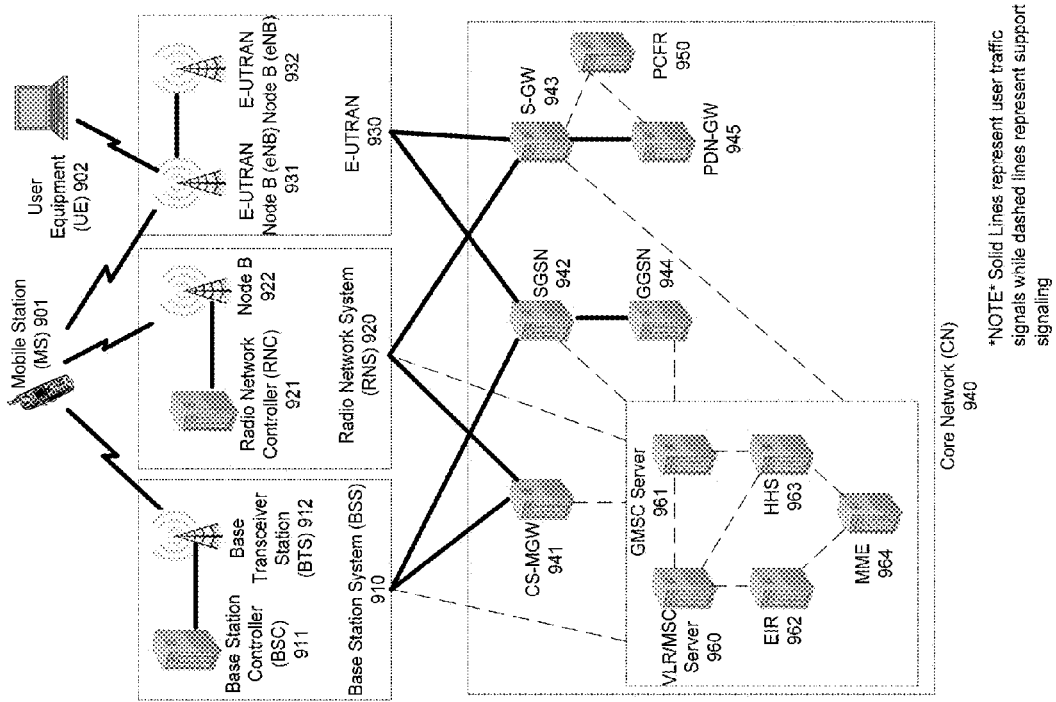
FIG. 8 illustrates a PLMN block diagram view of an exemplary architecture in which providing a message (call) to an emergency call center may be incorporated.

FIG. 8 illustrates a PLMN block diagram view of an exemplary architecture in providing an emergency message to an emergency call center may be incorporated. Mobile Station (MS) 901 is the physical equipment used by the PLMN subscriber. In one illustrative embodiment, communications device 104 may serve as Mobile Station 901. Mobile Station 901 may be one of, but not limited to, a cellular telephone, a cellular telephone in combination with another electronic device or any other wireless mobile communication device.

Mobile Station 901 may communicate wirelessly with Base Station System (BSS) 910. BSS 910 contains a Base Station Controller (BSC) 911 and a Base Transceiver Station (BTS) 912. BSS 910 may include a single BSC 911/BTS 912 pair (Base Station) or a system of BSC/BTS pairs which are part of a larger network. BSS 910 is responsible for communicating with Mobile Station 901 and may support one or more cells. BSS 910 is responsible for handling cellular traffic and signaling between Mobile Station 901 and Core Network 940. Typically, BSS 910 performs functions that include, but are not limited to, digital conversion of speech channels, allocation of channels to mobile devices, paging, and transmission/reception of cellular signals.

Additionally, Mobile Station 901 may communicate wirelessly with Radio Network System (RNS) 920. RNS 920 contains a Radio Network Controller (RNC) 921 and one or more Node(s) B 922. RNS 920 may support one or more cells. RNS 920 may also include one or more RNC 921/Node B 922 pairs or alternatively a single RNC 921 may manage multiple Nodes B 922. RNS 920 is responsible for communicating with Mobile Station 901 in its geographically defined area. RNC 921 is responsible for controlling the Node(s) B 922 that are connected to it and is a control element in a UMTS radio access network. RNC 921 performs functions such as, but not limited to, load control, packet scheduling, handover control, security functions, as well as controlling Mobile Station 901's access to the Core Network (CN) 940.

The evolved UMTS Terrestrial Radio Access Network (E-UTRAN) 930 is a radio access network that provides wireless data communications for Mobile Station 901 and User Equipment 902. E-UTRAN 930 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 930 may include of series of logical network components such as E-UTRAN Node B (eNB) 931 and E-UTRAN Node B (eNB) 932. E-UTRAN 930 may contain one or more eNBs. User Equipment 902 may be any user device capable of connecting to E-UTRAN 930 including, but not limited to, a personal computer, laptop, mobile device, wireless router, or other device capable of wireless connectivity to E-UTRAN 930. The improved performance of the E-UTRAN 930 relative to a typical UMTS network allows for increased bandwidth, spectral efficiency, and functionality including, but not limited to, voice, high-speed applications, large data transfer and IPTV, while still allowing for full mobility.

An exemplary embodiment of a mobile data and communication service that may be implemented in the PLMN architecture described in FIG. 8 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 901 may communicate with any or all of BSS 910, RNS 920, or E-UTRAN 930. In a illustrative system, each of BSS 910, RNS 920, and E-UTRAN 930 may provide Mobile Station 901 with access to Core Network 940. The Core Network 940 may include of a series of devices that route data and communications between end users. Core Network 940 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 941 is part of Core Network 940, and interacts with Visitor Location Register (VLR) and Mobile-Services Switching Center (MSC) Server 960 and Gateway MSC Server 961 in order to facilitate Core Network 940 resource control in the CS domain. Functions of CS-MGW 941 include, but are not limited to, media conversion, bearer control, payload processing and other mobile network processing such as handover or anchoring. CS-MGW 940 may receive connections to Mobile Station 901 through BSS 910, RNS 920 or both.

Serving GPRS Support Node (SGSN) 942 stores subscriber data regarding Mobile Station 901 in order to facilitate network functionality. SGSN 942 may store subscription information such as, but not limited to, the International Mobile Subscriber Identity (IMSI), temporary identities, or Packet Data Protocol (PDP) addresses. SGSN 942 may also store location information such as, but not limited to, the Gateway GPRS Support Node (GGSN) 944 address for each GGSN where an active PDP exists. GGSN 944 may implement a location register function to store subscriber data it receives from SGSN 942 such as subscription or location information.

Serving Gateway (S-GW) 943 is an interface which provides connectivity between E-UTRAN 930 and Core Network 940. Functions of S-GW 943 include, but are not limited to, packet routing, packet forwarding, transport level packet processing, event reporting to Policy and Charging Rules Function (PCRF) 950, and mobility anchoring for inter-network mobility. PCRF 950 uses information gathered from S-GW 943, as well as other sources, to make applicable policy and charging decisions related to data flows, network resources and other network administration functions. Packet Data Network Gateway (PDN-GW) 945 may provide user-to-services connectivity functionality including, but not limited to, network-wide mobility anchoring, bearer session anchoring and control, and IP address allocation for PS domain connections.

Home Subscriber Server (HSS) 963 is a database for user information, and stores subscription data regarding Mobile Station 901 or User Equipment 902 for handling calls or data sessions. Networks may contain one HSS 963 or more if additional resources are required. Exemplary data stored by HSS 963 include, but is not limited to, user identification, numbering and addressing information, security information, or location information. HSS 963 may also provide call or session establishment procedures in both the PS and CS domains.

The VLR/MSC Server 960 provides user location functionality. When Mobile Station 901 enters a new network location, it begins a registration procedure. A MSC Server for that location transfers the location information to the VLR for the area. A VLR and MSC Server may be located in the same computing environment, as is shown by VLR/MSC Server 960, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 901 registration or procedures for handover of Mobile Station 901 to a different section of the Core Network 940. GMSC Server 961 may serve as a connection to alternate GMSC Servers for other mobile stations in larger networks.

Equipment Identity Register (EIR) 962 is a logical element which may store the International Mobile Equipment Identities (IMEI) for Mobile Station 901. In a typical embodiment, user equipment may be classified as either "white listed" or "black listed" depending on its status in the network. In one embodiment, if Mobile Station 901 is stolen and put to use by an unauthorized user, it may be registered as "black listed" in EIR 962, preventing its use on the network. Mobility Management Entity (MME) 964 is a control node which may track Mobile Station 901 or User Equipment 902 if the devices are idle. Additional functionality may include the ability of MME 964 to contact an idle Mobile Station 901 or User Equipment 902 if retransmission of a previous session is required.

While example embodiments of generating and providing an emergency message to an emergency call center have been described in connection with various computing devices/processors, the underlying concepts can be applied to any computing device, processor, and/or system capable of facilitating generation of a message for an emergency call center as described herein. The methods and apparatuses for providing a message to an emergency call center, or certain aspects or portions thereof, can take the form of program code (e.g., instructions) embodied in tangible storage media having a physical structure, such as floppy diskettes, CD-ROMs, hard drives, or any other machine-readable storage medium having a physical tangible structure (computer-readable storage medium), wherein, when the program code is loaded into and executed by a machine, such as a computer, the machine becomes an apparatus for facilitating generation of a message for an emergency call center. A computer-readable storage medium, as described herein is an article of manufacture, and thus, not to be construed as a transient signal. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations.

The methods and apparatuses for providing a message to an emergency call center may be practiced via communications embodied in the form of program code that is transmitted over some transmission medium, such as over electrical wiring or cabling, through fiber optics, wherein, when the program code is received and loaded into and executed by a machine, such as an EPROM, a gate array, a programmable logic device (PLD), a client computer, or the like, the machine becomes an apparatus for facilitating initiation of a call to an emergency call center. When implemented on a general-purpose processor, the program code combines with the processor to provide a unique apparatus that operates to invoke the functionality for initiating a call to an emergency call center.

While providing a message to an emergency call center has been described in connection with the various embodiments of the various figures, it is to be understood that other similar embodiments can be used or modifications and additions can be made to the described embodiments for providing a message to an emergency call center. For example, generating and providing a message to an emergency call center as described in the present application may apply to any environment, whether wired or wireless, and may be applied to any number of devices connected via a communications network and interacting across the network. Therefore, providing a message to an emergency call center should not be limited to any single embodiment, but rather should be construed in breadth and scope in accordance with the appended claims.

What is claimed:

1. A method comprising:
   receiving a first message, the first message formatted according to a first protocol;
   determining that at least a portion of the received first message is not formatted in accordance with a second protocol;
   generating a reformatted message via a protocol server, wherein the generating comprises reformatting each portion of the at least one portion of the received first message formatted in accordance with the first protocol to a respective portion formatted in accordance with the second protocol; and
   providing a second message, wherein the second message comprises the reformatted message and an indication of the first protocol.

2. The method of claim 1, wherein an intended recipient of the provided new message comprises a public safety answering point.

3. The method of claim 1, wherein the first protocol comprises at least one of a short message service message, a multimedia messaging service message, an instant message, a web chat, or a real-time text.

4. The method of claim 1, wherein the second protocol comprises a teletypewriter protocol.

5. The method of claim 1, wherein the received emergency call originates from a mobile device or a telecommunications device for the deaf.

6. The method of claim 1, further comprising:
in response to receiving the first message, determining an identity of an originator of the first message, wherein the originator comprises at least one of a device or a user;
retrieving information from a database, the retrieved information associated with the identity of the originator of the message;
providing the retrieved information in a preamble of the second message, wherein the retrieved information comprises at least one of a known health condition associated with the originator or medications associated with the originator.

7. The method of claim 1, further comprising:
in response to receiving the first message, determining information associated with an originator of the emergency call, wherein the originator comprises at least one of a device or user;
providing the information associated with the originator in a preamble of the second message.

8. The method of claim 7, wherein the originator comprises a mobile device, and the information associated with the mobile device is automatically transmitted from the mobile device.

9. A device comprising:
a memory comprising executable instructions; and
a processor in communications with the memory, the instructions, when executed by the processor, cause the processor to effectuate operations comprising:
receiving a first message, the first message formatted according to a first protocol;
determining that at least a portion of the received first message is not formatted in accordance with a second protocol;
generating a reformatted message, wherein the generating comprises reformatting each portion of the at least one portion of the received first message formatted in accordance with the first protocol to a respective portion formatted in accordance with the second protocol; and
providing a second message, wherein the second message comprises the reformatted message and an indication of the first protocol.

10. The device of claim 9, wherein the provided new message is intended for a public safety answering point.

11. The device of claim 9, wherein the first protocol comprises at least one of a short message service message, a multimedia messaging service message, an instant message, a web chat, or a real-time text.

12. The device of claim 9, wherein the second protocol comprises a teletypewriter protocol.

13. The device of claim 1, wherein the received first message originates from a mobile device or a telecommunications device for the deaf.

14. The device of claim 9, wherein the processor is further configured to execute the instructions to perform operations comprising:
in response to receiving the first message, determining an identity of an originator of the emergency message, wherein the originator comprises at least one of a device or a user;
retrieving information from a database, the retrieved information associated with the identity of the originator of the message;
providing the retrieved information in a preamble of the second message, wherein the retrieved information comprises at least one of a known health condition associated with the originator or medications associated with the originator.

15. The device of claim 9, comprising further executable instructions, which when executed by the processor, cause the processor to perform operations comprising:
in response to receiving the first message, determining information associated with an originator of the emergency call, wherein the originator comprises at least one of a device or user;
providing the information associated with the originator in a preamble of the second message.

16. The device of claim 15, wherein the originator comprises a mobile device, and the information associated with the mobile device is automatically transmitted from the mobile device.

17. A non-transitory computer-readable storage medium having executable instructions stored thereon that when executed by a processor cause the processor to effectuate operations comprising:
receiving a first message, the first message formatted according to a first protocol;
determining that at least a portion of the received first message is not formatted in accordance with a second protocol;
generating a reformatted message, wherein the generating comprises reformatting each portion of the at least one portion of the received first message formatted in accordance with the first protocol to a respective portion formatted in accordance with the second protocol; and
providing a second message, wherein the second message comprises the reformatted message and an indication of the first protocol.

18. The computer-readable storage medium of claim 17, the operations further comprising:
in response to receiving the emergency message, determining an identity of an originator of the emergency message, wherein the originator comprises at least one of a device or a user;
retrieving information from a database, the retrieved information associated with the identity of the originator of the message; and
providing the retrieved information in a preamble of the new message, wherein the retrieved information comprises at least one of a known health condition associated with the originator or medications associated with the originator.

19. The computer-readable storage medium of claim 17, the operations further comprising:
in response to receiving the first message, determining information associated with an originator of the emergency call, wherein the originator comprises at least one of a device or user;
providing the information associated with the originator in a preamble of the second message.

20. The computer-readable storage medium of claim 17, wherein the originator comprises a mobile device, and the information associated with the mobile device is automatically transmitted from the mobile device.

* * * * *